(12) United States Patent
Min

(10) Patent No.: US 7,095,207 B1
(45) Date of Patent: Aug. 22, 2006

(54) LOAD AND SPEED SENSITIVE MOTOR STARTING CIRCUIT AND METHOD

(75) Inventor: Young-Kee Min, Elm Grove, WI (US)

(73) Assignee: YKM Technologies, LLC, Elm Grove, WI (US)

( * ) Notice: Subject to any disclaimer, the term of this patent is extended or adjusted under 35 U.S.C. 154(b) by 0 days.

(21) Appl. No.: 10/532,557

(22) PCT Filed: Oct. 22, 2002

(86) PCT No.: PCT/US02/33750

§ 371 (c)(1),
(2), (4) Date: Apr. 22, 2005

(87) PCT Pub. No.: WO2004/038906

PCT Pub. Date: May 6, 2004

(51) Int. Cl.
*H02P 1/42* (2006.01)

(52) U.S. Cl. ...................... 318/786; 318/785; 318/763; 318/778

(58) Field of Classification Search ................ 318/786, 318/785, 763, 778
See application file for complete search history.

(56) References Cited

U.S. PATENT DOCUMENTS

| | | | | |
|---|---|---|---|---|
| 4,622,506 A | | 11/1986 | Shemanske et al. | ......... 318/786 |
| 4,687,982 A | * | 8/1987 | Palaniappan | ................. 318/763 |
| 4,808,078 A | * | 2/1989 | Havens et al. | ................. 417/38 |
| 4,862,053 A | * | 8/1989 | Jordan et al. | ................ 318/786 |
| 4,958,118 A | * | 9/1990 | Pottebaum | .................... 318/727 |
| 5,017,853 A | * | 5/1991 | Chmiel | ........................ 318/786 |
| 5,051,681 A | * | 9/1991 | Schwarz | ..................... 318/786 |
| 5,235,265 A | * | 8/1993 | Chmiel | ........................ 318/786 |
| 5,296,795 A | * | 3/1994 | Dropps et al. | ............... 318/778 |
| 6,034,503 A | * | 3/2000 | Pertessis | ..................... 318/785 |
| 6,040,679 A | * | 3/2000 | Monk et al. | ................. 318/778 |
| 6,756,756 B1 | * | 6/2004 | Chmiel et al. | .............. 318/430 |

* cited by examiner

*Primary Examiner*—Rita Leykin
(74) *Attorney, Agent, or Firm*—Joseph S. Heino, Esq.; Patrick M. Bergin, Esq.

(57) ABSTRACT

A circuit and method measures the voltage at the main motor winding (1) and detects the points in the electromagnetic wave cycle at which this voltage "crosses" zero. The method and circuit also measures the voltage at the auxiliary motor winding (2). The voltages measured in the main winding (1) and in the auxiliary winding (2) are compared by the circuit (13) as a means for starting and restarting the auxiliary winding (2). The circuit and method also detects the points in the electromagnetic wave cycle where the current in the auxiliary winding "crosses" zero and compares the phase of these current zero crossing points with a window pulse (11) that is generated when the main voltage crosses zero. When the zero current crossing points fall within the window pulse, the auxiliary winding (2) is up to proper operating speed and the auxiliary winding (2) is disconnected by the starting circuit. If the load on the main motor winding (1) increases or the main motor winding (1) speed decreases below a certain predetermined speed, the auxiliary winding (2) is switched back into the circuit to boost the speed of the main motor winding (1).

30 Claims, 4 Drawing Sheets

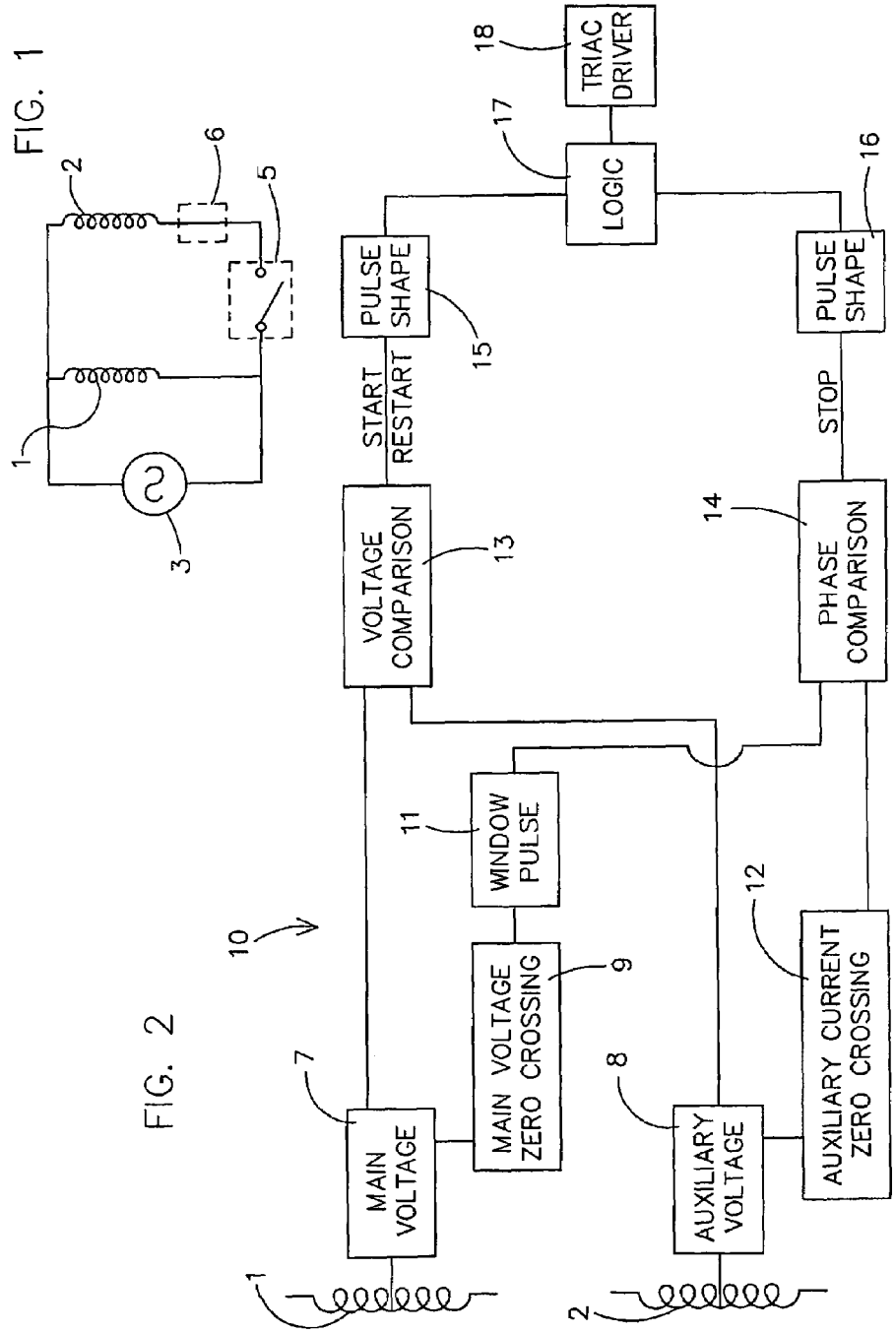

LOAD AND SPEED SENSITIVE MOTOR STARTING CIRCUIT AND METHOD

PRIORITY

This application is a 371 of PCT/US02/33750 and claims priority benefit dated Oct. 22, 2002.

FIELD OF THE INVENTION

The present invention relates generally to alternating current (AC) motors and to disconnect switches and circuits for use with AC motors. More specifically, the present invention relates to a circuit and method used with the start, or auxiliary, winding of an AC motor wherein the auxiliary winding is energized when starting the motor from rest and then disconnected at a given motor speed. The present invention also relates to such a circuit and method used with both split-phase and capacitor-start motors.

BACKGROUND OF THE INVENTION

It is well known that a single-phase AC motor produces an alternating magnetic field, one pulling first in one direction, then in the opposite direction as the polarity of the magnetic field changes. This is because the single-phase AC motor is energized by a single alternating current source. The major distinction between the different types of single-phase AC motors is how they go about starting the motor in a particular direction. Motor start is usually accomplished by some device or circuit that introduces a phase-shifted magnetic field on one side of the motor shaft, or rotor.

Split-phase motors achieve their starting capability by having two separate windings wound in the motor stator. The two windings are separated such that one winding is used only for starting. The starting, or auxiliary, winding is wound with a smaller wire size having higher electrical resistance than the main windings. Both windings are energized when the motor is started. The starting winding produces a field that appears to rotate. This rotation causes the motor to start. A centrifugal switch then disconnects the starting winding when the motor reaches a predetermined speed.

The winding and centrifugal switch arrangement of a capacitor-start motor is similar to that used in a split-phase motor. In the capacitor-start motor, a capacitor is used in series with the starting winding to produce a phase shift and the appearance of a rotating field. Here again, when the motor approaches a predetermined running speed, the starting switch opens thereby disconnecting the starting winding and the motor continues to run. One starting circuit for use with a motor of this type is disclosed in U.S. Pat. No. 4,622,506. The method and apparatus of the present invention is an improvement of that starting circuit.

Various types of switches, and controls therefor, are also well known in the electrical arts. This includes the mechanical switch and the centrifugal actuator mounted on the motor rotor, as alluded to previously. Mechanical switches of the centrifugal type are subject to problems such as limited life, fatigue, friction, vibration, mounting position, contact wear, among others. Also, the centrifugal switch includes a radial member that blocks axial airflow through the motor, which may impair cooling. This radial member also requires additional room in the motor housing, which may be objectionable in various applications.

In another known start winding disconnect system, Hall effect sensors or pick-up coils are used to detect motor speed to actuate a disconnect switch. This approach may be objectionable because of the requirement of adding an extra element such as a magnet on the motor shaft, and the pick-up coil to sense speed. These extra parts and the assembly required may be cost objectionable.

In another known disconnect system, a timer is started upon initial energization of the motor. When the timer times out, the disconnect switch is actuated to disconnect the auxiliary winding. This approach is not load or speed sensitive, but rather disconnects the auxiliary winding only after a preselected time regardless of motor speed and regardless of load. This approach is limited to dedicated applications where the load on the motor is known beforehand, and the delay time set accordingly. If the load on the motor is increased, the motor speed will not be up to the desired threshold at the noted cutout time. On the other hand, if the load on the motor is decreased, the motor will accelerate faster, and full voltage will be applied across the capacitor for a longer time than is desired, which in turn may damage the motor and/or the capacitor. Capacitor burn-out is a significant problem when reducing the loading of the motor in timed disconnect systems.

Another known approach is to sense current through the main winding and then actuate the disconnect switch at a designated condition. This requires a current sensor in series with the main winding and the start or auxiliary winding, which is objectionable to many manufacturers because of the cost of the extra components and the assembly cost of modifying the circuit and inserting such components in series in the circuit. This approach may also be objectionable due to the extra wattage and heat because current is still flowing through the sensor in the run mode after starting.

SUMMARY OF THE INVENTION

The present invention addresses and solves the above noted and other problems in a particularly simple and effective electronic control system for an auxiliary winding disconnect switch. The invention is load and speed sensitive, and is AC line voltage fluctuation insensitive. The invention eliminates the need for extra components on the motor shaft, around the shaft, or in series in the motor circuit. There is no need for physical modification of the motor components or the windings.

The present invention provides a new and useful circuit and method for measuring the voltage at the main motor winding and detecting the points in the electromagnetic wave cycle at which this voltage "crosses" zero. In other words, it detects the points at which the main motor winding voltage switches instantaneously from positive to negative and vice versa. The method and circuit also measures the voltage at the auxiliary motor winding. The voltages measured in the main winding and in the auxiliary winding are each compared by the circuit as a means for starting and restarting the auxiliary winding. The circuit and method also detects the points in the electromagnetic wave cycle where the current in the auxiliary winding "crosses" zero and compares the phase of these current zero crossing points with a window pulse that is generated when the main voltage crosses zero. When the zero current crossing points fall within the window pulse, this means that the auxiliary winding is up to proper operating speed and the auxiliary winding is disconnected by the starting circuit. If the load on the main motor winding increases thereby causing the motor rotor speed to decrease below a certain predetermined speed, the auxiliary winding will again be switched back into the circuit to boost the speed of the main motor winding.

As previously alluded to, the present invention provides an improvement over the circuit disclosed and claimed in U.S. Pat. No. 4,622,506. In the circuit of that embodiment, one was always measuring the voltage across the auxiliary winding. In the circuit of the present invention, one is always measuring the current zero crossing points in the auxiliary winding. More specifically, when the switch to the auxiliary winding is closed, the voltage of the auxiliary winding has no meaning because it contains no information as to motor speed, or RPM. This is why the auxiliary current is measured at this condition. When the switch is open, no current is passing through the auxiliary winding and there is no current information that is available. This is why the auxiliary winding voltage is measured at this condition, based on RPM information available.

Other aspects and advantages of the new and useful circuit and method will be apparent to those having skill in the art upon review of the attached drawings and the following detailed description.

BRIEF DESCRIPTION OF THE DRAWINGS

FIG. 1 schematically shows a typical environment in which the preferred embodiment of the invention is used.

FIG. 2 is a schematic block circuit diagram illustrating a motor starting circuit in accordance with the invention.

DETAILED DESCRIPTION

Figure 3:
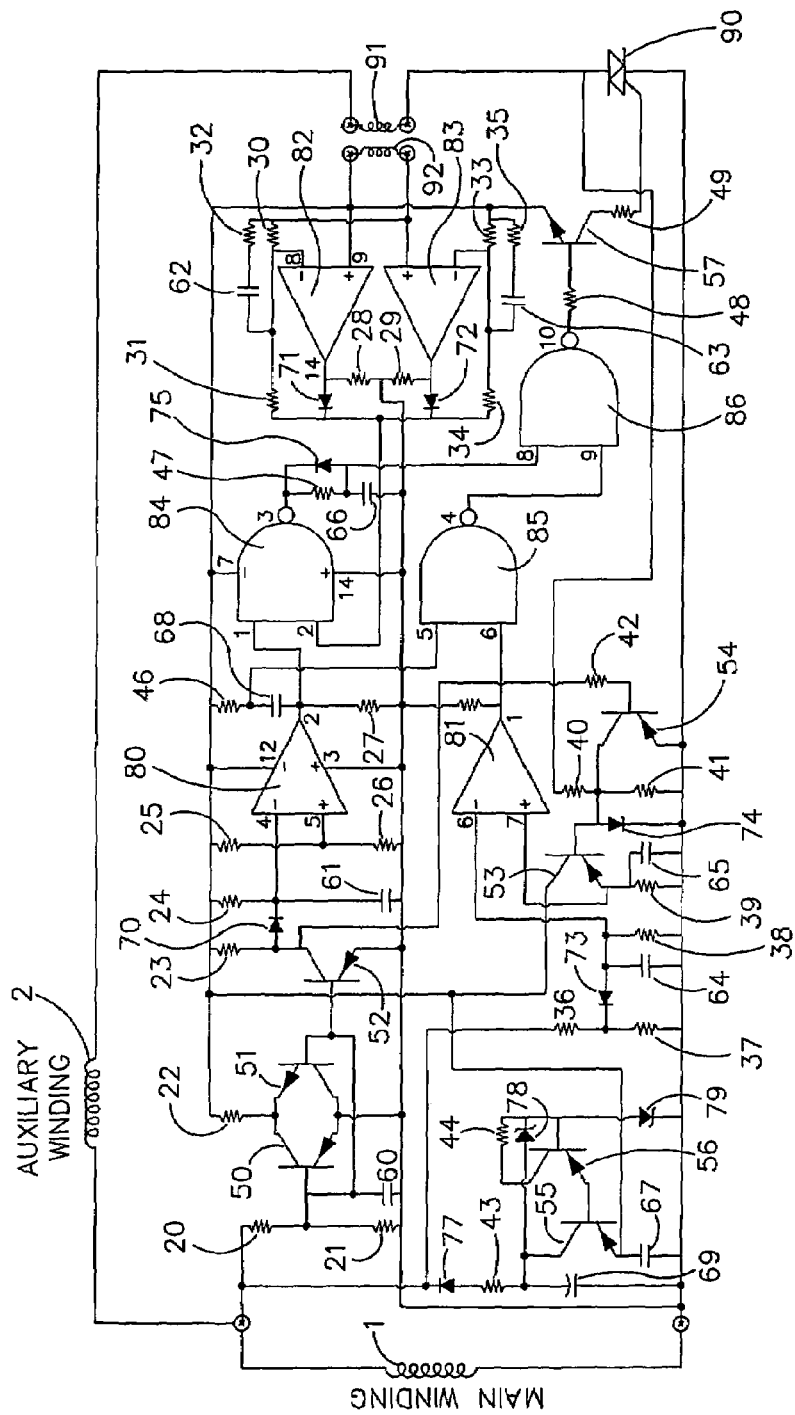
FIG. 3 is a detailed circuit diagram of the circuitry of FIG. 2.

Referring now to the drawings in detail wherein like numbered elements represent like elements throughout, FIG. 1 shows a main winding 1 and auxiliary winding 2 of an AC motor that are each connected to an AC power source 3. When the motor reaches a given threshold speed, a switch 5 that is connected in series with the auxiliary winding 2 is opened to disconnect the auxiliary winding 2 from the power source 3. A current detection means 6 is also provided for detecting and measuring the current flow through the auxiliary winding 2 when it is energized. The current detection means 6 provides the circuit of the present invention with the capability of detecting the points in the sinusoidal AC current waveform at which the current of the auxiliary winding 2 "crosses" the zero point. This will also be called the "current zero crossing" of the auxiliary winding 2. The significance of this will become more apparent later in this detailed description.

FIG. 2 shows a control circuit, generally identified 10, including main voltage detecting means 7 for sensing the magnitude of voltage across the main winding 1, and auxiliary voltage detector means 8 for sensing the magnitude of voltage across the auxiliary winding 2. A voltage comparator means 13 is provided which is responsive to the main and auxiliary voltage detectors 7, 8, respectively, and responds to a given relation between the magnitudes of the main and auxiliary winding voltages. A main voltage zero crossing means 9 is provided which senses the sinusoidal AC voltage waveform of the main winding voltage and the points at which the main winding voltage "crosses" zero or switches polarity. Window pulse means 11 responds to the main voltage zero crossing means 9 and generates a window pulse. The width of the window pulse that is generated is not a limitation of the present invention. An auxiliary winding current zero crossing means 12 is provided which senses the current flow through the auxiliary winding 2 and the points at which the auxiliary winding current also "crosses" zero or switches flow direction, as was mentioned previously. A phase comparison means 14 is provided which senses the auxiliary current zero crossing points in relation to the main voltage window pulse that has been generated. The voltage comparison means 13 generates a pulse shape 15 and the phase comparison means 14 generates a pulse shape 16 as well. Logic means 17 is provided to respond to the pulse shapes 15, 16 to turn "off" or to turn "on" the switch 5. This can be done, for example, by means of a triac driver 18 to disconnect or reconnect, respectively, the auxiliary winding 2 from the AC power source 3. In effect, the triac driver 18 is switched on and off by negative voltage, which will become apparent later in this detailed description.

FIG. 3 shows the detailed circuitry for the schematic shown in FIG. 2 and like reference numerals are used to facilitate clarity. There are various portions of the detailed circuitry that correspond to the various functions illustrated in FIG. 2. For example, the final logic 17 portion of the schematic shown in FIG. 2 corresponds to the NAND gate 86 shown in FIG. 3. The gate 86 is used with other circuit components to trigger the triac 90 and to turn the auxiliary winding 2 on and off. A pair of windings 91, 92 are transformer windings that effectively provide current sensing means for the auxiliary winding 2.

Again referring to FIG. 3, a power supply portion of the circuit includes a pair of transistors 55, 56 that are connected to other components including a pair of zener diodes 78, 79, a resistor 44 and a capacitor 67. The voltage across the main winding 1 is the same as the potential as across the resistor 43, the capacitor 69 and the diode 77. The main voltage sensing 7 portion of the circuit includes other resistors 36, 37, 38, capacitor 64, and a diode 73. The auxiliary voltage sensing 8 portion of the circuit includes the resistors 39, 40, 41, 42, the capacitor 65, the diode 74 and the transistor 53. Voltage comparison 13 is accomplished by use of a comparator 81. In actuality, the comparator 81 is one-fourth of a quad comparator chip, or other integrated circuit, which provides access to other comparators 80, 82, 83. Specifically, the input pin 6 of the comparator 81 senses the main winding voltage 7 and the input pin 7 of the same comparator 81 senses the auxiliary winding voltage 8. The output pin 1 of the comparator 81 feeds into the resistor 45 and the input pin 6 of the NAND gate 85. Depending upon the input at the input pin 5 of the gate 85, a pulse shape 15 is generated at the output pin 4 of the gate 85. The significance of this will be discussed later in this detailed description.

Referring now to the main voltage zero crossing 9 and the auxiliary current zero crossing 12 portions of the circuit 10, it will be seen that the voltage 7 across the main motor winding 1 is at the same potential as that across the resistors 20, 21 of the circuit shown in FIG. 3. Also included in the main voltage zero crossing 9 portion of the circuit are two transistors 50, 51, a resistor 22 and a capacitor 60. A delay portion of the circuit is also provided by the resistors 23, 24, 25, 26, the diode 70, the transistor 52 and the capacitor 61. As previously discussed, another comparator 80 is provided, the output pin 2 of which feeds into a pulse shape generator 11 portion of the circuit. The pulse shape generator 11 portion of the circuit includes the resistors 27, 46 and the capacitor 68.

The auxiliary winding current zero crossing 12 portion of the circuit includes the remaining pair of comparators 82, 83, a number of resistors 28, 29, 30, 31, 32, 33, 34, 35, a pair of capacitors 62, 63 and a pair of diodes 71, 72. As shown, the output pins 13, 14 of the comparators 82, 83, respectively, feed into one of the input pins 2 of a phase comparator gate 84. The output pin 3 of the phase comparator gate 84 generates a pulse 16 on the "stop" side of the circuit by means of the resistor 47, the capacitor 66 and the diode 75. This output is fed into the input gate 8 of the final logic gate 86. In this fashion, the pulse shapes 15, 16 are used to turn the triac driver 18 "on" and "off" as required. The triac switching circuit is provided by virtue of the resistors 48, 49 and the transistor 57 at the output pin 10 of the logic gate 86. By use of this configuration, the triac driver 18 is switched on and off by negative voltage. See FIG. 2.

The initial starting of the motor on application of line voltage 3 is activated by means of the voltage comparison 13. The voltage comparison 13 senses the low auxiliary winding voltage relative to the main winding voltage and initiates the triac turn on through logic 17. Immediately after the first turn on, the auxiliary winding 2 is kept energized by the phase comparison 14. The voltage comparison 13 cannot be used to maintain the starting condition because, after the first energization of the auxiliary winding 2, the voltage on the auxiliary winding 2 is that of the line voltage source 3, and does not represent the motor speed by means of induced voltage from the main winding 1 through the rotor. The maintenance of the auxiliary energization by means of winding current phase controls is explained in following paragraphs.

Figure 4:
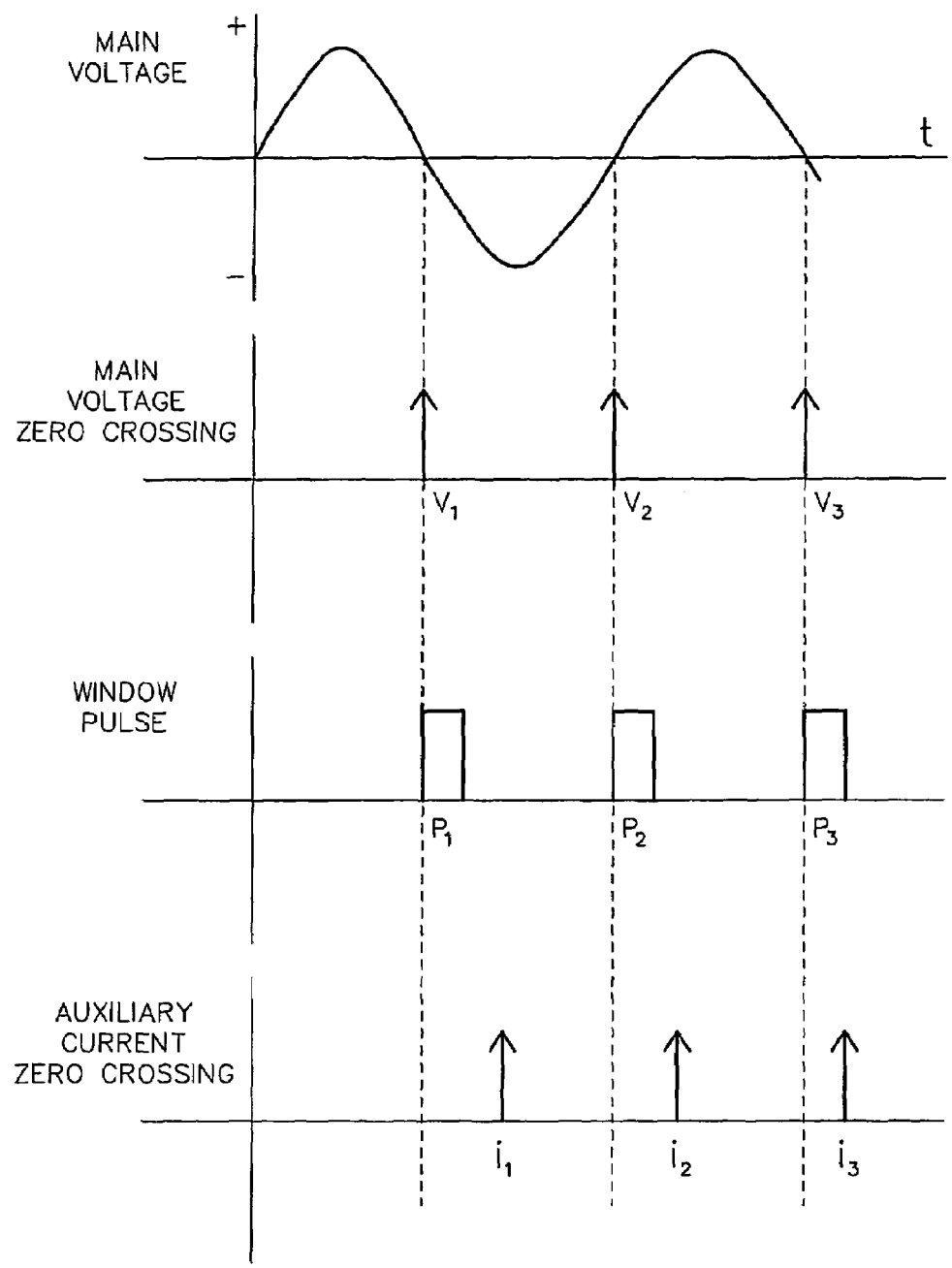
FIG. 4 is a timing diagram illustrating operation of the circuitry of FIGS. 2 and 3.

Referring now to FIG. 4, it will be demonstrated how the main voltage detecting means 7 in the circuit of the present invention views the magnitude of the main winding voltage, shown in the top graph as a generally sinusoidal waveform. The graph below it shows the points V1, V2, V3 at which the main winding voltage crosses zero. That is, the points at which voltage polarity is instantaneously reversed. The next graph illustrates that, at each of these voltage zero crossing points V1, V2, V3, a window pulse P1, P2, P3, respectively, is generated by the window pulse means 11. As the speed of the motor "ramps up" or increases, the auxiliary winding current zero crossing means 12 senses the current flow through the auxiliary winding 2 and the points I1, I2, I3 at which the auxiliary winding current "crosses" zero or switches flow direction. Phase comparison means 14 is provided to sense the auxiliary winding current zero crossing points I1, I2, I3 in relation to the main voltage window pulses P1, P2, P3. As the auxiliary current zero crossing point I3, for example, falls within the window pulse P3, the phase comparator 14 generates a pulse shape 16 to be received by the logic control 17 and turn off the triac driver 18. If, because of load increase causing a reduction of motor speed, the auxiliary winding 2 needs to be reenergized, the voltage comparison means 13 is activated to the restart condition, which is the same as the initial motor start condition. The starting sequence is thereby reactivated to connect the auxiliary winding 2. The sequence is that voltage comparison 13 is activated by the sensing of a low auxiliary winding voltage 2 relative to the main winding voltage 1. This sensing is used for initial turn on the triac 18 after which the phase comparison means 14 is used to maintain the auxiliary winding 2 reenergization until the motor speed increases to the desird auxiliary winding denergization speed.

Figure 5:
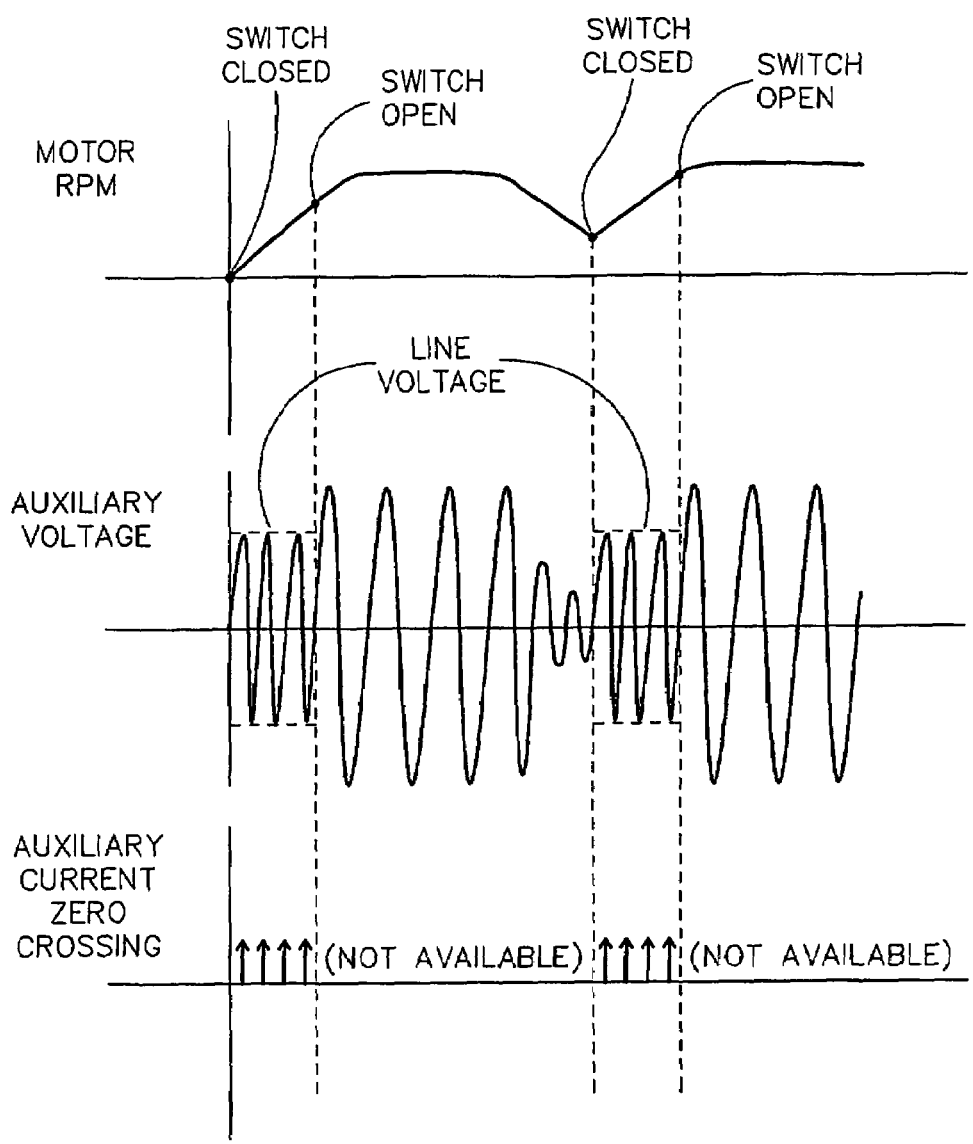
FIG. 5 is another timing diagram illustrating operation of the circuitry of FIGS. 2 and 3 as it relates to RPM information.

Referring now to FIGS. 1 and 5, it will be seen that function of the circuit is derived from the accessibility of RPM information of the motor. For example, when the switch 5 is open, the auxiliary voltage provides RPM information and there is no auxiliary current available. That is, the auxiliary winding voltage is really a function of the voltage across the main winding 1 and the motor RPM. The voltage across the auxiliary winding 2 has a direct relationship to the motor RPM. When the switch 5 is closed, the auxiliary voltage is the same as the line voltage and it contains no RPM information. On the other hand, the auxiliary current zero crossing does have RPM information. This is translated as shown in the uppermost figure showing the switch 5 "on" and "off" positions. As the switch 5 is initially closed, the speed of the motor "ramps up" to the point that the auxiliary winding 2 can be "cut out" of the circuit and the switch 5 opened up. During this time, auxiliary current zero crossing is determined by the circuit. After the switch 5 opens up, there is no current flowing through the auxiliary winding 2 and the voltage across the auxiliary winding 2 is a function of the voltage across the main winding 1 and the motor RPM. As the motor continues and RPM decreases due to load imposed on the motor, the switch 5 again needs to be closed to increase the motor torque to try and regain speed. This switch 5 closure "boosts" the motor so that the RPM increases to the point that the auxiliary winding 1 no longer needs to be energized. This continues throughout the operation cycle of the motor.

Accordingly, it will be apparent that there has been provided a new and useful circuit and method for measuring the voltage at the main motor winding and detecting points in the electromagnetic wave cycle where the main winding voltage "crosses" zero. The method and circuit also measures the voltage at the auxiliary motor winding. The voltages measured in the main winding and the auxiliary winding are each compared by the circuit as a means for starting and restarting the auxiliary winding. The circuit and method also detects the points in the electromagnetic wave cycle at which the current in the auxiliary winding "crosses" zero and compares the phase of these current zero crossing points with a window pulse that is generated when the main winding voltage crosses zero. When the zero current crossing point falls within the window pulse, the auxiliary winding is up to proper operating speed and the auxiliary winding is disconnected by the switching circuit. If the load on the motor increases causing the motor speed to decrease below a certain level, the auxiliary winding will again be switched back into the circuit to boost the speed of the main motor winding.

The scope of this invention is to include deenergization of the auxiliary winding based on current phase changes with motor speed of the main winding and/or the auxiliary winding current. With the auxiliary winding energized, both the main winding and auxiliary winding current phases change with motor speed during the motor starting or slowing. The disclosed circuit functions on the phase shift of the auxiliary winding relative to the line voltage phase. The main winding current phase shift with motor speed change is in the opposite direction as found for the auxiliary current. A change in logic and the circuit location of the current sensor from the auxiliary winding to the main winding could have been made to activate the deenergization of the auxiliary winding on the phase shift of the main winding current relative to the line voltage. Further, with two current sensors, the deactivation could have been activated by comparison of the phase of the auxiliary winding relative to the main winding. The circuit previously described in detail is an embodiment based on an attempt to minimize the cost of achieving the desired control. it is to be understood that the scope of the disclosure and appended claims are not limited to the specific embodiments described and depicted herein.

The principles of this invention having been fully explained in connection with the foregoing, I hereby claim as my invention:

1. In an AC motor having a main winding and an auxiliary winding both connectable to an AC power source, and having a switch for disconnecting said auxiliary winding from said AC source, an improved control circuit for said switch comprising
    main voltage detector means for sensing the magnitude of the AC main winding voltage,
    main voltage zero crossing detector means for sensing the points at which main winding voltage polarity is instantaneously reversed,
    window pulse generating means for generating a pulse at the points at which main winding voltage polarity is reverse,
    auxiliary voltage detector means for sensing the magnitude of the AC auxiliary winding voltage,
    voltage comparator means for sensing the difference in voltage magnitude between the main winding and the auxiliary winding,
    auxiliary current zero crossing detector means for sensing the points at which auxiliary current flow changes direction, and
    phase comparator means for sensing the phase shift between the main voltage zero crossing points and the auxiliary current zero crossing points,
    wherein said phase comparator means operates to disconnect said auxiliary winding when the phase shift of the auxiliary winding current zero crossing falls within the main voltage pulse as a function of motor speed.

2. The control circuit of claim 1 wherein said voltage comparator means operates to connect or reconnect said auxiliary winding when the magnitude of the voltage of the auxiliary winding decreases below a predetermined value relative to the magnitude of the voltage of the main winding as a function of motor load and motor speed.

3. The control circuit of claim 2 wherein said voltage comparator includes pulse shape generating means for generating a first logic pulse and said phase comparator includes pulse shape generating means for generating a second logic pulse.

4. The control circuit of claim 3 wherein said first and second logic pulses are used by a logic controller to turn said switch on and off.

5. The control circuit of claim 4 wherein said switch comprises a triac device that is triggered by a negative voltage value.

6. In an AC motor having a main winding and an auxiliary winding both connectable to an AC power source, and having a switch for disconnecting said auxiliary winding from said AC source, an improved method for controlling said switch comprising the steps of
    sensing the magnitude of the AC main winding voltage,
    sensing the points at which main winding voltage polarity is instantaneously reversed,
    generating a pulse at the points at which main winding voltage polarity is reversed,
    sensing the magnitude of the AC auxiliary winding voltage,
    sensing the difference in voltage magnitude between the main winding and the auxiliary winding,
    sensing the points at which auxiliary current flow changes direction, and
    sensing the phase shift between the main voltage zero crossing points and the auxiliary current zero crossing points,
    wherein said phase shift operates to disconnect said auxiliary winding when the phase shift of the auxiliary winding current zero crossing falls within the main voltage pulse as a function of motor speed.

7. The method of claim 6 including the step of connecting or reconnecting said auxiliary winding when the magnitude of the voltage of the auxiliary winding decreases below a predetermined value relative to the magnitude of the voltage of the main winding as a function of motor load and motor speed.

8. The method of claim 7 including the steps of generating a first logic pulse as a result of voltage comparison and generating a second logic pulse as a result of phase comparison.

9. The method of claim 8 wherein said first and second logic pulses are used by a logic controller to turn said switch on and off.

10. The method of claim 9 including the step of providing a triac device that is triggered by a negative voltage value as the switch.

11. In an AC motor having a main winding and an auxiliary winding both connectable to an AC power source, and having a swithch for disconnecting said auxiliary winding from said AC source, an improved control circuit for said switch comprising
    main voltage detector means for sensing the magnitude of the AC main winding voltage,
    main voltage phase detector means for provision of a reference for phase comparison of main winding current phase sensing.
    auxiliary voltage detector means for sensing the magnitude of the AC auxiliary winding voltage,
    voltage comparator means for sensing the difference in voltage magnitude between the main winding and the auxiliary winding,
    auxiliary current phase detector means for measuring the main winding phase shift, and
    phase comparator means for sensing the phase shift between the main voltage and the main winding current,
    wherein said phase comparator means operates to disconnect said auxiliary winding when the phase shift of the main winding falls within a predetermined value of the phase relative to the main voltage as a function of motor speed.

12. The control circuit of claim 11 wherein said voltage comparator means operates to connect or reconnect said auxiliary winding when the magnitude of the voltage of the auxiliary winding decreases below a predetermined value relative to the magnitude of the voltage of the main winding as a function of motor speed.

13. The control circuit of claim 12 wherein said voltage comparator includes pulse shape generating means for generating a first logic pulse and said phase comparator includes pulse shape generating means for generating a second logic pulse.

14. The control circuit of claim 13 wherein said first and second logic pulses are used by a logic controller to turn said switch on and off.

15. The control circuit of claim 14 wherein said switch comprises a triac.

16. In an AC motor having a main winding and an auxiliary winding both connectable to an AC power source, and having a switch for disconnecting said auxiliary winding from said AC source, an improved method for controlling said switch comprising the steps of
    sensing the magnitude of the AC main winding voltage, sensing the points at which main winding voltage polarity is instantaneously reversed, generating a pulse at the points at which main winding voltage polarity is reversed, sensing the magnitude of the AC auxiliary winding voltage, sensing the difference in voltage magnitude between the main winding and the auxiliary winding, sensing the points at which main current flow changes direction, and sensing the phase shift between the main voltage zero crossing points and the main current zero crossing points, wherein said phase shift operates to disconnect said auxiliary winding when the phase shift of the main winding current zero crossing falls outside the main voltage pulse as a function of motor speed.

17. The method of claim 16 including the step of connecting or reconnecting said auxiliary winding when the magnitude of the voltage of the auxiliary winding decreases below a predetermined value relative to the magnitude of the voltage of the main winding as a function of motor speed.

18. The method of claim 17 including the steps of generating a first logic pulse as a result of voltage comparison and generating a second logic pulse as a result of phase comparison.

19. The method of claim 8 wherein said first and second logic pulses are used by a logic controller to turn said switch on and off.

20. The method of claim 9 including the step of providing a triac device that is triggered by a negative voltage value as the switch.

21. In an AC motor having a main winding and an auxiliary winding both connectable to an AC power source, and having a switch for disconnecting said auxiliary winding from said AC source, an improved control circuit for said switch comprising main voltage detector means for sensing the magnitude of the AC main winding voltage, main current phase detector means for provision of a reference for phase comparison of auxiliary current phase sensing.

auxiliary voltage detector means for sensing the magnitude of the AC auxiliary winding voltage, voltage comparator means for sensing the difference in voltage magnitude between the main winding and the auxiliary winding, auxiliary current phase detector means for measuring the auxiliary winding phase shift, and phase comparator means for sensing the phase shift between the main current and the auxiliary current, wherein said phase comparator means operates to disconnect said auxiliary winding when the phase shift of the auxiliary winding current falls within a predetermined value of the phase relative to the main winding current as a function of motor speed.

22. The control circuit of claim 21 wherein said voltage comparator means operates to connect or reconnect said auxiliary winding when the magnitude of the voltage of the auxiliary winding decreases below a predetermined value relative to the magnitude of the voltage of the main winding as a function of motor speed.

23. The control circuit of claim 22 wherein said voltage comparator includes pulse shape generating means for generating a first logic pulse and said phase comparator includes pulse shape generating means for generating a second logic pulse.

24. The control circuit of claim 23 wherein said first and second logic pulses are used by a logic controller to turn said switch on and off.

25. The control circuit of claim 24 wherein said switch comprises a triac.

26. In an AC motor having a main winding and an auxiliary winding both connectable to an AC power source, and having a switch for disconnecting said auxiliary winding from said AC source, an improved method for controlling said switch comprising the steps of sensing the magnitude of the AC main winding voltage, sensing the points at which main winding voltage polarity is instantaneously reversed, generating a pulse at the points at which main winding voltage polarity is reverse, sensing the magnitude of the AC auxiliary winding voltage, sensing the difference in voltage magnitude between the main winding and the auxiliary winding, sensing the points at which the main current flow changes direction, sensing the points at which auxiliary current flow changes direction, and sensing the phase shift between the main current zero crossing points and the auxiliary current zero crossing points, wherein said phase shift operates to disconnect said auxiliary winding when the phase shift of the auxiliary winding current zero crossing is within a predetermined time relative to the main current zero crossing as a function of motor speed.

27. The method of claim 26 including the step of connecting or reconnecting said auxiliary winding when the magnitude of the voltage of the auxiliary winding decreases below a predetermined value relative to the magnitude of the voltage of the main winding as a function of motor speed.

28. The method of claim 27 including the steps of generating a first logic pulse as a result of voltage comparison and generating a second logic pulse as a result of phase comparison.

29. The method of claim 28 wherein said first and second logic pulses are used by a logic controller to turn said switch on and off.

30. The method of claim 29 including the step of providing a triac device that is triggered by a negative voltage value as the switch.

* * * * *